Oct. 19, 1971   W. B. MOZEY, JR   3,613,283
BAYONET AND UTILITY KNIFE
Filed Nov. 3, 1969
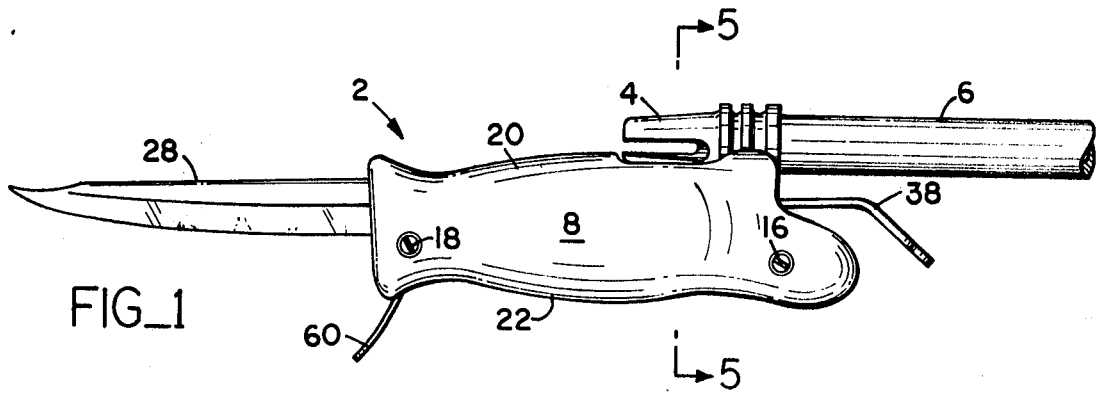
FIG_1
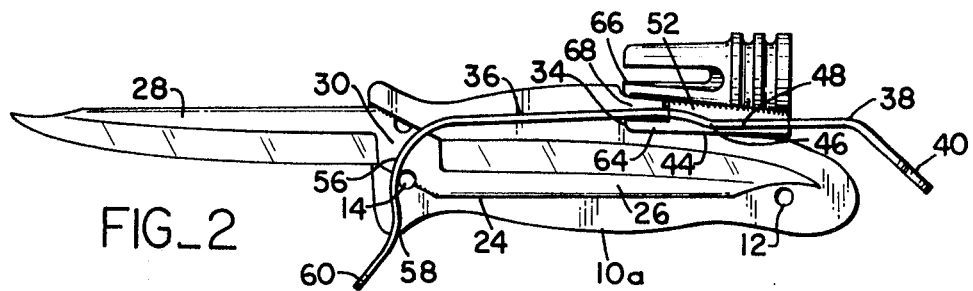
FIG_2
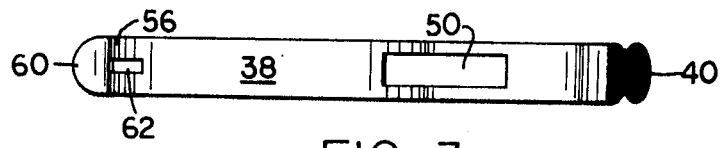
FIG_3
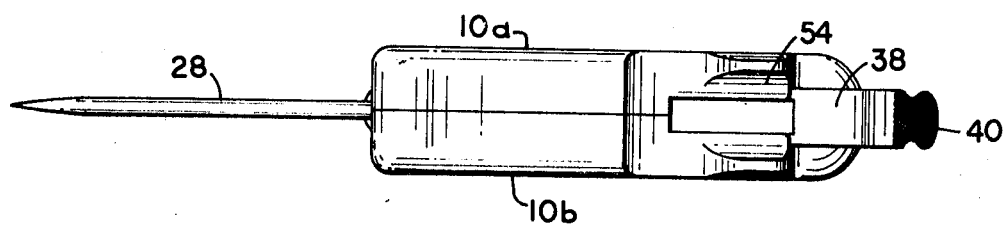
FIG_4
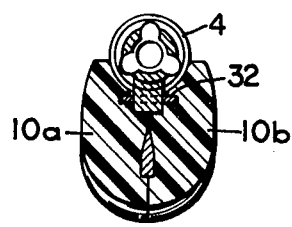
FIG_5
INVENTOR.
WILLIAM B. MOZEY, JR.
BY
ATTORNEY

United States Patent Office
3,613,283
Patented Oct. 19, 1971

1

3,613,283
BAYONET AND UTILITY KNIFE
William B. Mozey, Jr., 4139 Colorado Ave. S.,
Minneapolis, Minn. 55416
Filed Nov. 3, 1969, Ser. No. 873,349
Int. Cl. F41c 27/02
U.S. Cl. 42—86                                                    6 Claims

ABSTRACT OF THE DISCLOSURE

A bayonet designed as a utility knife having a handle shaped to be conveniently gripped, the handle having a hollow center to house one blade of a reversible double-bladed knife and having a slotted band secured in said handle cooperating with a groove in said handle to form a keyway to lockably engage a key fixedly attached to the flash suppressor of a rifle and/or a machine gun or submachine gun.

BACKGROUND OF THE INVENTION

Field of the invention

While bayonets are rarely used to inflict casualties on an opposing military force, the possibility that they may be required has resulted in the continued issue of bayonet to all soldiers. In actuality, they are required and used as knives to perform numerous non-combative tasks. A bayonet which is small, which can readily be attached to a rifle without interfering with the rifle's precision in shooting, and one which can be quickly detached and used as a utility knife, is an advantageous weapon. Preferably, such a bayonet should be made of few parts, easily assembled and disassembled to simplify manufacturing and replacement type repairs if needed.

Description of the prior art

The bayonets of the prior art are primarily the classical type of double-edge blade fixedly attached to a rearward shank. These bayonets are designed for the most part to connect to and lock with the T piece often found on rifles. Illustrative bayonets and their locking mechanisms may be found in U.S. Pat. Nos. 2,728,159 and 3,076,280.

DESCRIPTION OF THE FIGURES

FIG. 1 is a side view of a bayonet constructed in accordance with the present invention, the flash suppressor to which it is attached and part of the barrel of the rifle to which the flash suppressor is attached.

FIG. 2 is a longitudinal sectional view of the bayonet as attached to the flash suppressor.

FIG. 3 is a top view of the lever means as viewed independent of the bayonet handle.

FIG. 4 is a top view of the bayonet without the flash suppressor attachment.

FIG. 5 is a sectional view taken along the direction of arrows 5—5 of FIG. 1.

SUMMARY OF THE INVENTION

The bayonet of this invention, designed primarily for use as a utility knife, has a hollow handle split vertically in the longitudinal direction, the handle being in a shape for convenient gripping. The hollow is shaped to rigidly encase the shank of a knife, which may be one blade of a two-bladed reversible knife.

A knife, preferably a two-bladed reversible knife, is provided, the two blades being connected by a diagonal connecting section. One of the blades may be for special purpose use, such as a saw-tooth design for cutting

2 barbed wire, etc. The enclosed blade may act as the shank of the exposed blade and is rigidly held in the handle.

In the upper portion and to the rear of the handle is an inverted T-shaped groove, the horizontal portion of the groove communicating with a passageway extending through the handle. A spring lock means is part of a long strap-shaped spring-steel band, beginning rearwardly of said handle and passing through the horizontal portion of the T-groove and then through the passageway. While passing through the T-groove, the band forms a relatively flat V. The portion of said band in the T-groove is slotted to fit a key rigidly affixed to the flash suppressor of a rifle. The band extends forwardly through said handle and then downwardly to extend through said handle to provide a finger guard. The downward portion of the band has an opening for the blade and connecting section to pass through.

Rigidly connected to a flash suppressor is a key to fit the slot in said band. The key has a finger extending forwardly so as to form a pair of jaws with the flash suppressor to rigidly engage the handle.

DESCRIPTION OF THE PREFERRED EMBODIMENTS

A bayonet 2 is connected to a flash suppressor 4 which in turn is rigidly connected, usually by threaded means not shown, to the barrel of a rifle 6.

The handle of the bayonet 8 is divided into two sections, 10a and 10b. The second section, 10b, is the mirror image of the first section, 10a, shown in profile. The two sections are held together by any convenent fastening means. One section, 10a, may have holes 12 and 14 threaded so as to engage bolts 16 and 18 to hold the two sections tightly together.

The shape of the handle is convenient for gripping the side of the handle (only one side, 20, being shown) being relatively flat while the bottom of the handle 22 being rounded so that the fingers can comfortably hold the handle.

The two sections are grooved inside so as to form a chamber 24 in the shape of a blade 26. The encased blade 26 acts as the shank of a second blade 28. The encased blade is connected by a diagonal connection 30. If the exposed blade 28 becomes dulled or broken, it may be readily exchanged with the encased blade 26. Since the handle is readily disassembled and assembled, the exchange may be quickly carried out under adverse conditions with the simplest of tools, the rim of a cartridge case.

In the rear upward portion of the handle is an inverted T-groove 32. The horizontal portion of the T extends into the handle to form a small chamber 34. The horizontal portion of the T-groove as well as the chamber 34 communicates with a passageway 36. A strap-shaped spring-steel band 38, which is stiff, but has some resiliency, extends through the T-groove 32 and the passageway 36.

The band 38 begins rearwardly of the handle. The rearward portion of the band 38 extends upwardly so as to provide a depressing arm means 40. The end 42 of the depressing arm means 40 may be sacrificed as shown, so as to provide better gripping. The band 38 then continues forwardly in a downwardly direction so as to meet the floor 44 of the T-groove at a point 46 near the middle of the T-groove.

The band 38 is made of a metal which is sufficiently hardened so it will substantially retain its shape when formed. However, when the arm 48 is depressed by pressing on the arm 40 it will return to its preferred position when pressure is released from arm 40. From the point of engagement 46, the band rises to form the roof of chamber 34 and then enters passageway 36 in the handle, continuing forwardly in the handle.

The band is slotted the full length of the T-groove, with the slot 50 extending somewhat farther beyond the rear of the T-groove. The slot and T-groove form a keyway. The slot 50 with the depressing arm means 40 provide a spring lock for the key 52, giving rigidity for retaining the key 52 in the spring lock slot 50. The slot 50 has a width substantially the same as the width of the vertical arm of the T-groove. The rearward portion 54 of the T-groove is flared to provide a slot for the flash suppressor 4.

After continuing forwardly through the passageway 36, the band 38 forms a downward curve 56 following the contour of the passageway 36. The band 38 then continues through the handle at opening 58 to form a finger guard 60. An opening 62 is provided in the curved portion of the band 56 to permit the passage of the blade through the band. The opening 62 is shaped so as to hold relatively snugly the diagonal connector 30 which connects the two blades 26 and 28. This adds further rigidity to the structure.

The bayonet is attached to the rifle by means of a key 52 which is rigidly connected to the flash suppressor 4. The key has an extending finger 64 which fits into the chamber 34 and forms with the arm 66 of the flash suppressor a pair of jaws rigidly engaging the handle portion 68 which extends over the chamber 34. By depressing the arm 48 by means of the arm 40, the key 52 may be easily slipped into the keyway formed by the slot 50, T-groove 32 and chamber 34 to be rigidly held in a locked position. Conversely, the bayonet may be rapidly removed by depressing the arm 48 which releases the key 52.

The bayonet of this invention is therefore simply assembled from a minimal number of pieces, contains no moving parts, and provides a convenient bayonet, fighting knife and utility knife. Also, by virtue of the reversible blade, in field use, if one blade is dulled or broken, it may be readily exchanged for a second blade which is protected in the hollow portion of the handle. The bayonet is light, easily assembled or disassembled, and replacement parts can be readily obtained and replaced by the soldier with the simplest of tools, regardless of weather, terrain or light conditions.

This bayonet can be also manufactured solely for use as a sportsman's utility knife by minor design changes which eliminate those portions enabling it to be attached to a rifle.

I claim:

1. A bayonet comprising a blade having a rearwardly extending shank, a handle fixedly securing said shank in a manner so that said blade extends out the forward end of said handle in operating position, a band having a forward portion fixedly secured by said handle and a rearward resilient portion including an end portion extending toward the rearward end of said handle, said band having a slot formed in said rearward portion and said rearward portion being connected for limited downward movement, a groove formed in said handle adjacent said slot and cooperating with said slot to form a keyway, and a key connectable to a rifle and engageable in said keyway, said key having a forward end for abutting against said handle and a rearward end engageable into and abutting against the back end of said slot to disconnectably connect said key in said keyway, said resilient rearward portion of said band being depressable to free key from said slot to disconnect said key from said keyway.

2. The bayonet of claim 1 further characterized in a second slot formed in the forward portion of said band for engaging the shank of said blade.

3. The bayonet of claim 1 further characterized in that the handle is formed in two separable parts, said parts having elongated cooperating grooves for securing the shank of said blade and said band and means for fastening said parts together to secure said shank and said band in said handle.

4. The bayonet of claim 3 further characterized in that the forward end of said band extends out of the forward portion of said handle and forms a finger guard for said bayonet.

5. The bayonet of claim 3 where the rearwardly extending shank is formed in the shape of a blade having the mirror image of the forward blade.

6. The bayonet of claim 3 further characterized in that said key is rigidly affixed to the flash suppressor of a rifle and has a tooth extending forwardly, and said keyway extends into and under a portion of said handle to form a chamber for said tooth.

References Cited

UNITED STATES PATENTS

| | | | |
|---|---|---|---|
| 30,539 | 10/1860 | McEvoy | 30—296 X |
| 134,608 | 1/1873 | Neil | 30—296 |
| 143,495 | 10/1873 | Burton | 30—296 |
| 1,259,682 | 3/1918 | Tuth | 30—296 X |
| 2,507,019 | 5/1950 | Johnson | 30—299 X |

LESTER M. SWINGLE, Primary Examiner

J. C. PETERS, Assistant Examiner

U.S. Cl. X.R.

30—296, 299